United States Patent Office.

LEANDER R. STREETER, OF CHELSEA, ASSIGNOR TO HIMSELF AND A. B. ELY, (TRUSTEES,) OF NEWTON, MASSACHUSETTS.

Letters Patent No. 88,228, dated March 23, 1869.

---

IMPROVED METHOD OF VENEERING ARTICLES WITH PYROXYLE.

---

The Schedule referred to in these Letters Patent and making part of the same

---

Be it known that I, LEANDER R. STREETER, of Chelsea, in the State of Massachusetts, have discovered or invented certain new and useful Improvements in Veneering Dental Base-Plates and Artificial Gums, &c., of which the following is a full description.

The nature of my invention consists in facing, or veneering, with pyroxyle or xyloidine, and its compounds, dental base-plates, and gums, &c., composed of other materials, or compounds, for purposes of protection and strength.

The pyroxyle, or its compound, is prepared in the usual well-known manner, by the action of solvents, and brought into a plastic, pasty, or fluid state, and is then applied as a facing, or layer, or veneer, upon the other material composing the base-plate, &c. Or the pasty solution may be reduced to a thin sheet, and partially or wholly dried, and if dried, softened by a solvent, and thus employed and applied as a veneer.

In this manner, base-plates of other material may be preserved from corrosion, deterioration, and injury, and may be, in some cases, materially strengthened, while, by the use of suitable pigments in the pyroxyle, the plates may appear of the natural color of the flesh.

In applying the facing, different modes must be pursued, according to the nature and condition of the respective materials to be united; but, in every case there should be a perfect union of the facing with the plate, by direct contact, or by cementation, and this requires proper packing with pressure, or heat and pressure.

Where pressure alone is used, the result must be produced either by the adhesiveness of the facing, or veneering, and its affinity, or that of its solvent, for the material to be veneered, or by the interposition of a suitable cement. But, where heat and pressure are used, the heat should be applied with or after the pressure, bearing in mind, that where the materials mainly composing the plate are of an adhesive, or cementive nature, when heated, no other interposing or cementing-agent need be used.

In veneering a resinous and fibrous base-plate, the pyroxyle must be applied with such use of a solvent as will make it adhere, or some suitable cement, not requiring heat, where pressure alone is used. But otherwise, after the moulds are packed, introduce the pyroxyle alone, or with some suitable cement, and bring the flask together, and subject the whole to the required heat.

As the veneer must adapt itself to all the curves and corrugations of the mould, or plate, it must be used in a condition sufficiently pliant and yielding for the purpose.

In applying the veneer to metallic or rubber base-plates, a third cementing-material should be interposed, to which each may be secured, by heat, or otherwise, and the two brought together, with heat sufficient to make the cement adhesive, and held till firmly united.

The heat should not ordinarily exceed 220°, and the pressure should continue till the evaporation is essentially or quite completed.

Plates of a coarser, may be veneered with a finer quality of material, in some cases to good advantage.

I am aware that pyroxyle has been attempted to be spread upon the surface of cloth, by what may be termed pressure. And I am also aware that it has quite recently been applied as a coating on all sides of various articles, by a peculiar process of ejection into a mould in which the article is suspended.

This spreading, by a knife or a roller, or this process of coating referred to, I do not claim. But, where the pyroxyle, or its compounds, in a plastic or flexible state, is attached to the surface of an article as a veneer, and then made to adhere (with or without the use of a separate cement) to such surface, by means of compression, and (where desirable) also of heat, in a mould, or press, so that the veneer shall not only firmly adhere to the article, but shall also conform to and assume all the forms, and shapes, and configurations of the mould, as well as of the surface of the article being compressed, and held until the work is completed, I desire to claim, beyond the mere subject of dental plates and gums, as I believe it is original with me.

What I claim, is—

1. The use of plastic pyroxyle or xyloidine, and its compounds, as a veneer, or facing upon dental base-plates, or artificial gums, substantially as described.

2. The combination of pyroxyle, or its compounds, with dental plates, or gums, substantially as described.

3. The combination of artificial teeth with dental plates, or gums, veneered with pyroxyle, or its compounds, substantially as described.

4. Dental plates and gums, veneered with pyroxyle, or its compounds, substantially as described.

5. Veneering the surfaces of articles with plastic or flexible pyroxyle, or its compounds, when the same is attached as a veneer, substantially as described, with or without cement, and made to adhere and assume shape in presses, or moulds, by compression, with heat, if need be, substantially as set forth.

In testimony whereof, I have hereunto subscribed my name.

L. R. STREETER.

Witnesses:
J. W. PRESTON,
M. E. INGALLS.